(12) United States Patent
Hsiao et al.

(10) Patent No.: US 7,675,545 B2
(45) Date of Patent: Mar. 9, 2010

(54) CAMERA MODULE HAVING IMAGE PROCESSING PROCEDURE AND METHOD FOR INTEGRATING THE SAME WITH HOST

(75) Inventors: Hsi-Tsu Hsiao, Hsinchu Hsien (TW); Shih-Chang Hsu, Taipei Hsien (TW); Jing-Shiang Tseng, Hsinchu (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 1277 days.

(21) Appl. No.: 10/839,423

(22) Filed: May 5, 2004

(65) Prior Publication Data

US 2005/0248657 A1  Nov. 10, 2005

(51) Int. Cl.
*H04N 5/225* (2006.01)
*H04N 13/04* (2006.01)

(52) U.S. Cl. .................................................. 348/207.1

(58) Field of Classification Search .............. 348/207.1, 348/143, 207.11, 52, 211.1; 455/566, 574, 455/343.2, 344, 457, 517, 550.1, 552.1, 553.1, 455/556.1, 556.2, 557
See application file for complete search history.

(56) References Cited

U.S. PATENT DOCUMENTS

| | | | | |
|---|---|---|---|---|
| 6,764,346 | B2 * | 7/2004 | Fujita et al. | 439/638 |
| 7,250,943 | B2 * | 7/2007 | Kamiyama | 345/204 |
| 2002/0003570 | A1 * | 1/2002 | Suzuki et al. | 348/143 |
| 2002/0052220 | A1 * | 5/2002 | Tsukada et al. | 455/566 |
| 2004/0072589 | A1 * | 4/2004 | Hamamura et al. | 455/550.1 |

* cited by examiner

*Primary Examiner*—Tuan Ho
*Assistant Examiner*—Selam Gebriel
(74) *Attorney, Agent, or Firm*—Stroock & Stroock & Lavan LLP (57) ABSTRACT

A camera module of image processing and a method for integrating the camera module with a host are described. The camera module has a display control interface, an image sensor, and a camera control circuit. The display control interface is used to control at least one display module. The image sensor is used to capture image and provide image data signals. The camera control circuit is used to control the camera module. The camera module bypasses the display data signals of a host to display control modules according to a bypass signal. The camera module also performs image processing according to the bypass signal and a command set.

17 Claims, 6 Drawing Sheets

CAMERA MODULE HAVING IMAGE PROCESSING PROCEDURE AND METHOD FOR INTEGRATING THE SAME WITH HOST

BACKGROUND

1. Field of Invention

The present invention relates to a camera module having an image processing procedure. More particularly, the present invention relates to a system and method of integrating the camera module with a host and display modules.

2. Description of Related Art

Because of the fast development of digital image processing technology, digital cameras have become important in consumer electronic products. A digital camera has many advantages. For example, no film is needed in a digital camera, a large amount of image data can be stored in the digital camera, and the captured image can be instantly displayed after taking a picture. A digital camera has the function of image processing, such as brightness adjustment and color adjustment. The image data can be stored digitally and be transferred through the Internet. The image data can also be recorded in a CDRW permanently.

Moreover, because of the development of communication technology, cell phone products are prevalent. With the increase of the transmission speed, cells phones that support multimedia become the main stream in the development of cell phone technology. A cell phone having a built-in digital camera is a typical example. A user can transmit any information to any person from any location through the communication system. The functions of other portable electronic apparatus, such as a personal digital assistant (PDA), are enhanced as well by a built-in digital camera. Therefore, a portable electronic apparatus having a digital camera is an important trend.

Figure 1A:
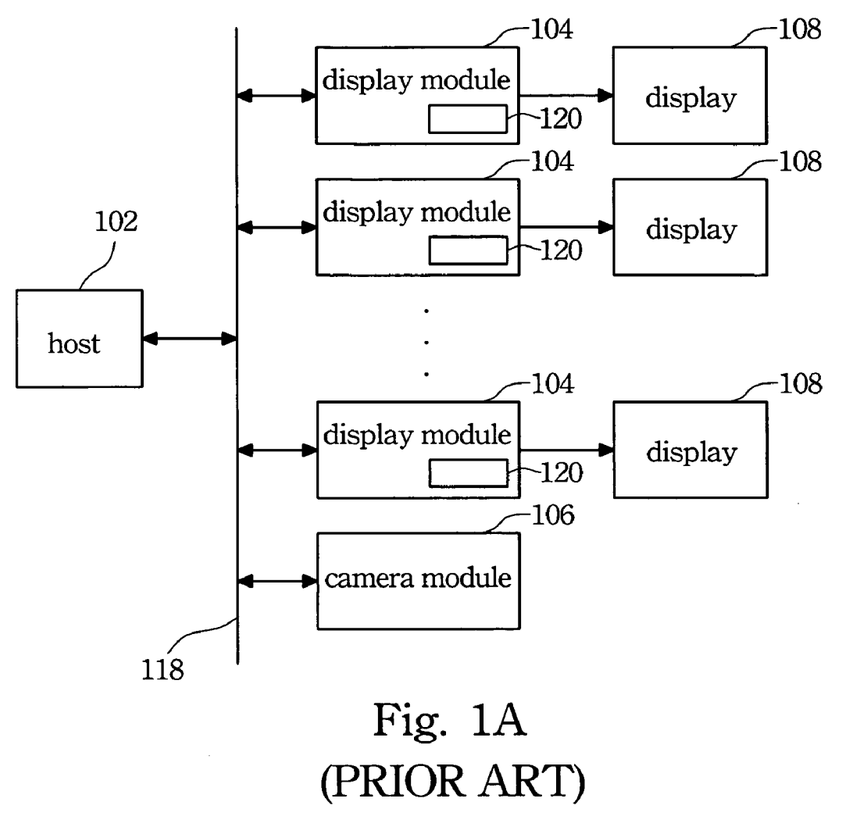
FIG. 1A is a block diagram illustrating a built-in digital camera integrated into a portable electronic apparatus according to the prior art.

FIG. 1A is a block diagram illustrating a built-in digital camera integrated into a portable electronic apparatus. As shown in FIG. 1A, at least one display module 104 and a camera module 106 are connected to a host 102, respectively. The host 102 is, for example, a cell phone or a personal digital assistant (PDA).

The at least one display module 104 shares a data bus 118 with the camera module 106. The camera module 106 performs an image processing procedure and generates a set of display data signals. The display data signals are sent to the host 102 through the data bus 108. The host 102 then transmits the display data signals to the corresponding display modules 104. If the speed of the central processing unit of the host is not high enough, the data transmission is too slow.

Figure 1B:
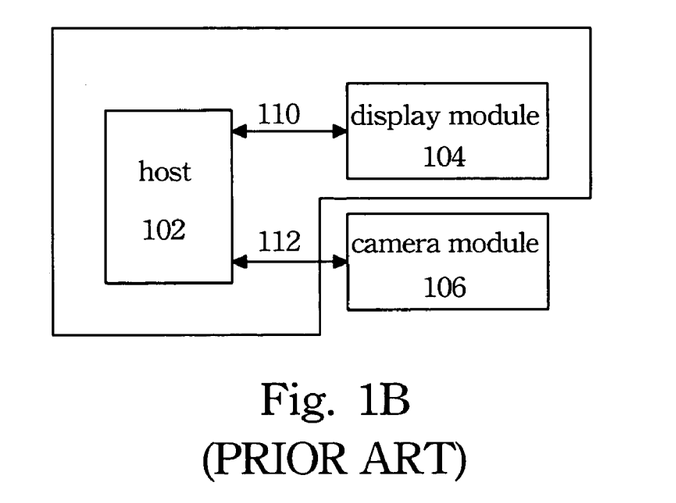
FIG. 1B is a block diagram illustrating an external enclosure digital camera integrated into a portable electronic apparatus according to the prior art.

FIG. 1B is a block diagram illustrating an external enclosure camera module integrated into a portable electronic apparatus. As shown in FIG. 1B, a host 102 is connected to a display module 104 and a camera module 106, respectively. The host 102 generates a display module control interface signal 110 to control the display module 104. The host 102 communicates with the camera module 106 through a camera module control interface signal 112. A designer has to modify the software of the host 102 to support the camera module 106. This increases the development time of products.

SUMMARY

It is therefore an objective of the present invention to provide a camera module having an image processing procedure. The camera module has both features of built-in and external enclosure.

It is another objective of the present invention to provide a camera module. Without greatly modifying the software of the host, the camera module can be easily integrated into a portable electronic apparatus such as a cell phone or a personal digital assistant (PDA).

It is still another objective of the present invention to provide a camera module capable of controlling a plurality of display modules efficiently, such as controlling a cell phone having two display modules. The camera module can be integrated into a host, such as a cell phone or a personal digital assistant (PDA).

It is still another objective of the present invention to provide a camera module. The camera module only needs a chip select signal to select a plurality of display modules.

It is still another objective of the present invention to provide a camera module. The camera module can directly perform an image processing procedure on the image captured by the image sensor and send the results to the display modules. The camera module can be integrated into a host, such as a cell phone or a personal digital assistant (PDA).

In accordance with the foregoing and other objectives of the present invention, a camera module is described. The camera module includes at least a display module control interface, an image sensor, and a camera control circuit. The camera control circuit is connected to the image sensor and the display module control interface, respectively. Moreover, at least one display module is connected to the camera module.

In the invention, the camera module is connected to the host through a True IDE interface. The True IDE interface is originally used in the read/write of a memory, such as a Compact Flash Card. In the invention, the usage of the True IDE interface is extended. The signals provided by the True IDE interface are used to achieve the function of controlling the camera module.

The display module control interface is used to control at least one display module. The image sensor is used to capture an image and provides a set of image data signals. The camera control circuit receives a bypass signal. When the bypass signal is enabled, the camera module is in a bypass mode. When the bypass signal is disabled, the camera module is in a bridge mode.

In the bypass mode, the camera control circuit receives a set of display data signals from the host. The camera control circuit bypasses the display data signals to the corresponding display modules via the display module control interface.

The camera control circuit receives a set of host control signals. The host control signals include a chip select signal, a set of command signals, and a data write enable signal.

The combination of the command signals and the chip select signal are used to select the corresponding display modules. When the data write enable signal is enabled, the camera module uses the host data signals as the display data signals and bypasses the host data signals to the corresponding display modules. The host data signals are written into the display module memories of the corresponding display modules. The command set includes the host control signals, address signals, and data signals.

In the bridge mode, the camera module receives a command set. The camera module performs the image processing procedure according to the command set and the image data signals. The command set includes camera control signals, address signals, and data signals.

The camera control circuit receives the chip select signal. The camera control circuit selects the corresponding display modules according to the combination of the chip select signal and the command set. The camera control circuit performs the image processing procedure according to the command set and the image data signals to generate the display data signals and to send the display data signals to the corresponding display modules.

In a preferred embodiment, the camera control circuit includes a memory, a register, and an internal circuit. The internal circuit is connected to the register and the memory, respectively.

The internal circuit receives the command set and stores the command set into the register. The internal circuit performs the image processing procedure in cooperation with the memory, according to the command set stored in the register and the image data signals, to generate the display data signals and to send the display data signals to the corresponding display modules.

The camera module has the function of bypassing the display data signals from the host to the display modules according to the bypass signal. The camera module also has the function of performing the image processing procedure according to the bypass signal and the command set. Therefore, the camera module has both features of built-in and external enclosure. Without greatly modifying the software of the host, the camera module can be easily integrated into a portable electronic apparatus such as a cell phone or a personal digital assistant (PDA).

When the bypass signal is enabled, the combination of the command signals and the chip select signal are used to select the corresponding display modules. When the bypass signal is disabled, the camera control circuit selects the corresponding display modules according to the combination of the chip select signal and the command set. Therefore, the invention can efficiently control a portable electronic apparatus having a plurality of display modules, such as a cell phone having two display modules. The invention needs only a chip select signal to select a plurality of display modules.

Because the internal circuit, in cooperation with the memory, performs the image processing procedure according to the command set stored in the register and the image data signals to generate the display data signals and to send the display data signals to the corresponding display modules, the invention can directly perform an image processing procedure on the image captured by the image sensor and send the results to the display modules. The camera module can be integrated into a host, such as a cell phone or a personal digital assistant (PDA).

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
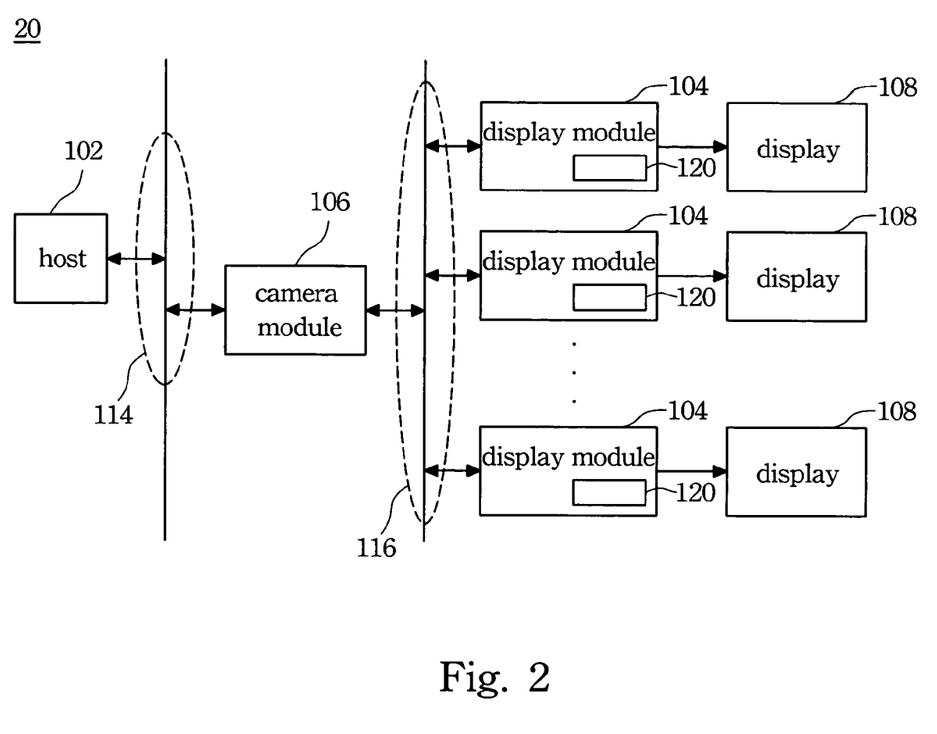
FIG. 2 is a block diagram illustrating the preferred embodiment of the invention.

FIG. 2 is a block diagram illustrating the preferred embodiment of the invention. With reference to FIG. 2, an electronic system 20 having an image processing procedure is shown. The electronic system 20 has a host 102, a camera module 106, at least one display module 104, at least one display 108, a first interface 114, and a second interface 116. The camera module 106 is connected to the host 102 via the first interface 114 and connected to the at least one display module 104 via the second interface 116.

In the embodiment, the interface between the host 102 and the camera module 106 is a True IDE interface. True IDE interface is originally used in the application for the read and write of a memory, such as a Compact Flash Card. In the embodiment, the use of the True IDE interface is extended. The True IDE interface is used to achieve the object of controlling the camera module 106. The control signals for controlling the camera module 106 include at least a BYPASS signal, an I80M68 signal, and an IOIS16 signal. The BYPASS signal is used to select the control of the display module 104 or the control of the camera module 106. The I80M68 signal is used to determine that the interface mode of the camera module 106 is Intel 80 mode or Motorola 68 Mode. The IOIS16 signal is used to determine that the bit width of the data bus of the camera module 106 is 8 bit or 16 bit. The use of the signals is described in the following.

Figure 3A:
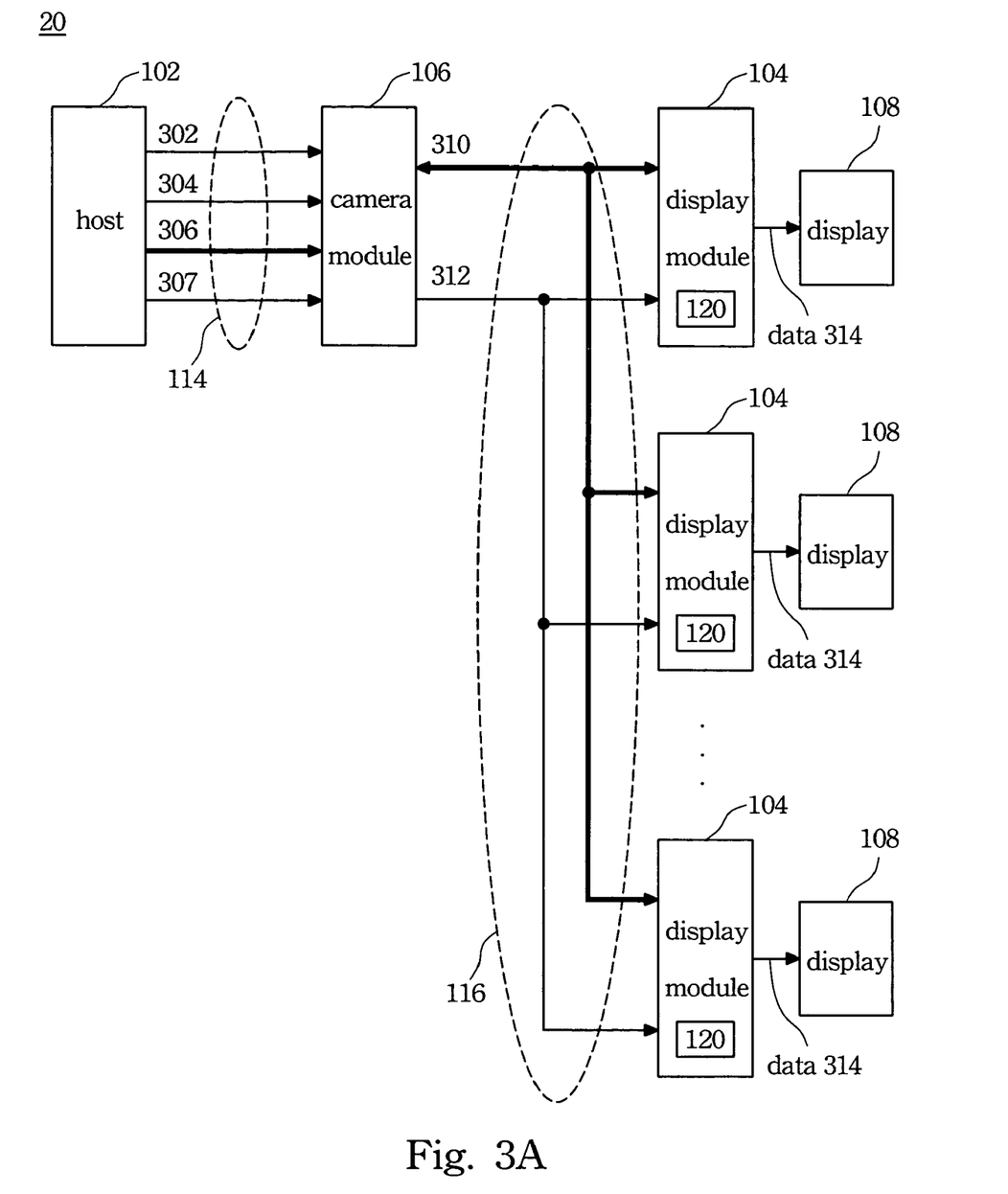
FIG. 3A is an example illustrating the detailed signals of the electronic system according to the present invention.

FIG. 3A is an example illustrating the detailed signals of the electronic system 20. With reference to FIG. 3A, the host 102 generates a bypass signal 302 (i.e. the BYPASS signal). The host 102 has a bypass mode and a bridge mode. In bypass mode, the bypass signal 302 is enabled. The host 102 generates a set of host data signals 306 and sends the host data signals 306 to the camera module 106 via the first interface 114. In bridge mode, the bypass signal 302 is disabled. The host 102 generates a command set including a camera address signal 304, host data signals 306, and host control signals 307. The host 102 sends the command set to the camera module 106 via the first interface 114.

With reference to FIG. 3A, the camera module 106 receives the bypass signal 302. When the bypass signal 302 is enabled, the camera module 106 uses the host data signals 306 as the display data signal 310. The camera module 106 bypasses the host data signals 306 to the corresponding at least one display module 104. When the bypass signal 302 is disabled, the camera module 106 performs the image processing procedure in response to the command set.

Figure 4:
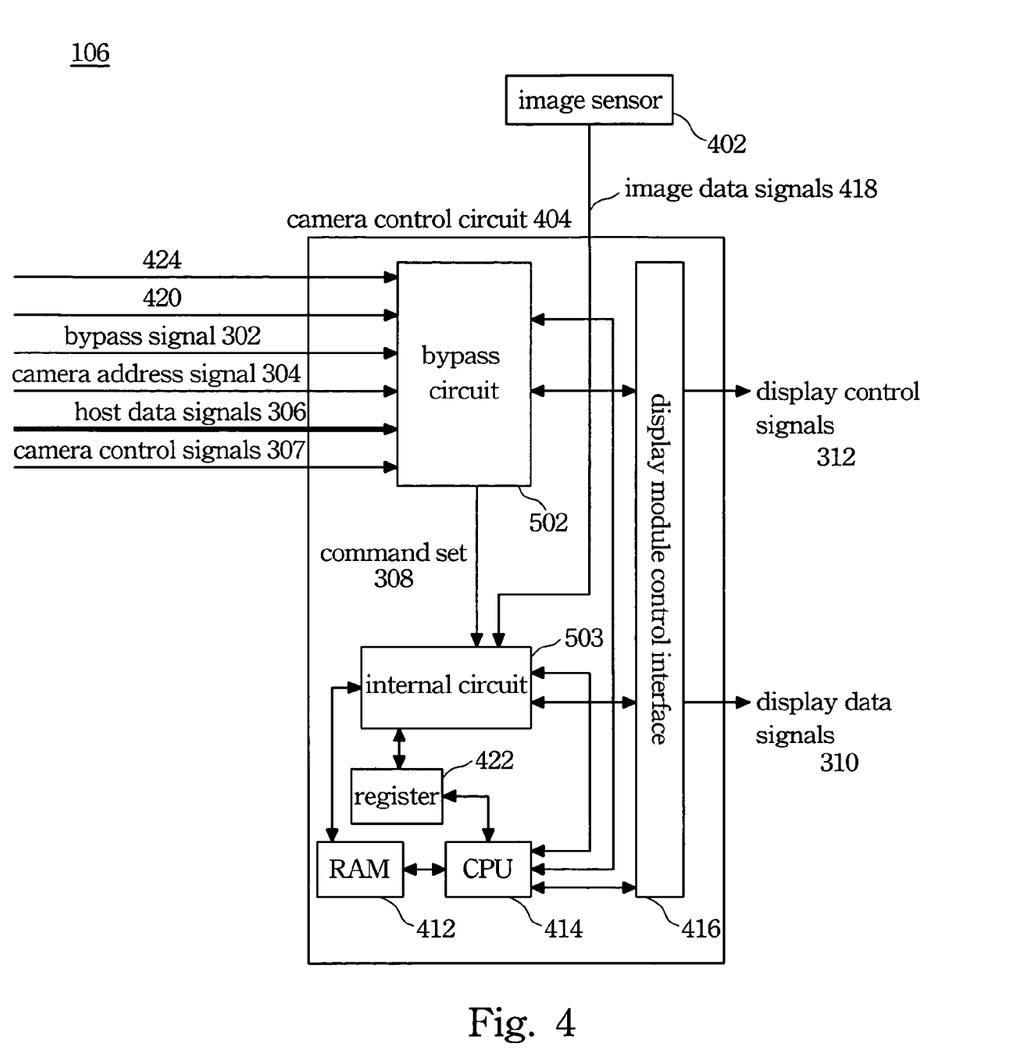
FIG. 4 is a diagram illustrating an example of the camera module according to the present invention.

With reference to FIG. 3A, the display module 104 sends the data 314 to the corresponding displays 108 according to a set of display control signals 312 and a set of display data signals 310. The displays 108 are, for example, liquid crystal display panels A more detailed example is provided in the following description. FIG. 4 is a diagram illustrating an example of the camera module 106. With reference to FIG. 4, the camera module 106 has an image sensor 402 and a camera control circuit 404. The camera control circuit 404 has a bypass circuit 502, an internal circuit 503, a memory 412, a register 422, a central processing unit 414, and a display module control interface 416.

For example, in the control interface of True IDE, the camera module 106 has a set of TaskFile Control Registers. There are 8 control registers in the TaskFile Control Registers. The address signals A2-A0 are used to select the control registers. The control register of the Offset 0 is a data register. The host 102 controls the read/write of the data block through the control register. Each data block size for transmission is 512 bytes. The control resister of Offset 7 is a command/status register. The rest control registers Offset 1-6 can be used in the control parameters of the camera module for transmission.

With reference to FIG. 3A and FIG. 4, the camera module 106 has an image sensor 402. The image sensor 402 is used to capture image and generates image data signals 418. The image sensor 402 is, for example, a CCD sensor or a CMOS sensor.

With reference to FIG. 4, the image sensor 402 is connected to the internal circuit 503. The bypass circuit 502 is connected to the internal circuit 503. The internal circuit 503 is connected to the register 422. The display module control interface 416 is connected to the bypass circuit 502 and the internal circuit 503. The memory 412 is connected to the internal circuit 502. The central processing unit 414 is connected to the bypass circuit 502, the internal circuit 503, the display module control interface 416, the register 422, and the memory 412, respectively.

Figure 3B:
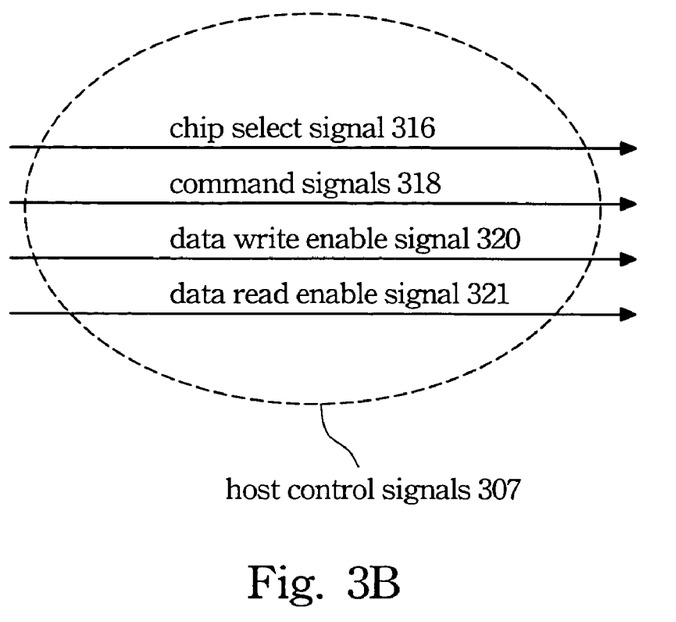
FIG. 3B is a diagram illustrating the host control signals according to the present invention.
Figure 3C:
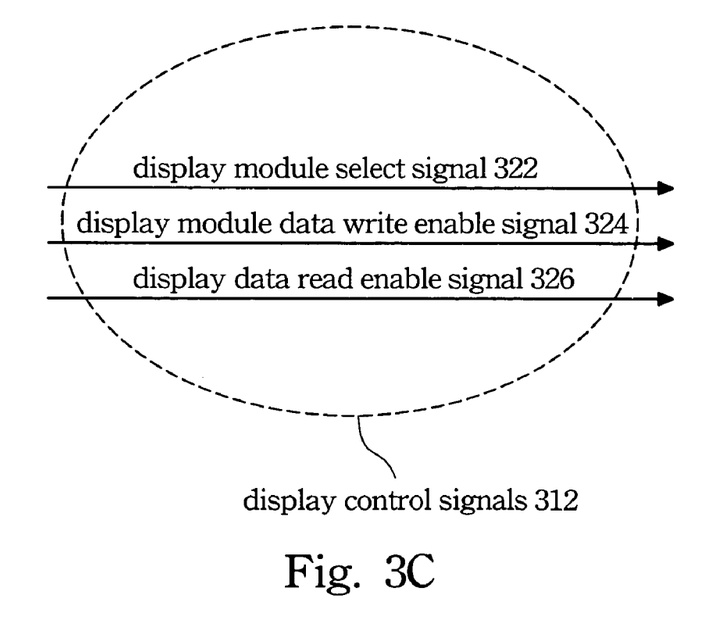
FIG. 3C is a diagram illustrating the display control signals according to the present invention.

FIG. 3C is a diagram illustrating the display control signals 312. With reference to FIG. 3A, FIG. 3C and FIG. 4, the display module control interface 416 transmits a set of display control signals 312 to the selected display modules 104. The display control signals 312 include a display module select signal 322, a display module data write enable signal 324, and a display data read enable signal 326.

The operation of the bypass mode is described in the following. FIG. 3B is a diagram illustrating the host control signals 307. With reference to FIG. 3A and FIG. 3B, when the bypass signal 302 is enabled, the host 102 sends a set of host control signals 307 to the camera module 106 via the first interface 114. The host control signals 307 include a chip select signal 316, a set of command signals 318, a data write enable signal 320, and a data read enable signal 321.

With reference to FIG. 3A, FIG. 3B, and FIG. 4, the command signals 318 are sent to the camera module 106, especially to the bypass circuit 502. The combination of the command signals 318 and the chip select signal 316 is used to select the corresponding display modules 104. Therefore, the camera module 106 can efficiently control a plurality of display modules 104. The camera module 106 only needs a chip select signal 316 to select a plurality of display modules.

More details are described with reference to FIG. 3A, FIG. 3B, and FIG. 4. The bypass circuit 502 receives a set of host data signals 306. The bypass circuit 502 uses the host data signals 306 as a set of display data signals 312. The host data signals 306 are bypassed to the selected display module 104 via the display module control interface 416.

With reference to FIG. 3A, FIG. 3B, and FIG. 4, when the data write enable signal 320 is enabled, the bypass circuit 502 used the host data signals 306 as the display data signals 310. The bypass circuit 502 bypasses the host data signals 306 to the selected corresponding display modules 104 via the display module control interface 416. The host data signals 306 are written in the display module memory 120 of the corresponding display modules 104. For example, a True IDE interface is used to provide the command signals 318, the chip select signal 316, the data write enable signal 320, and the host data signals 306. Any interfaces having the function of providing the command signals 318, the chip select signals 316, the data write enable signals 320, and the host data signals 306 can be alternatives.

The bypass circuit 502 uses the data write enable signal 320 as the display module data write enable signal 324 and transmits the data write enable signal 320 to the selected display modules 104.

With reference to FIG. 3A and FIG. 3C, when the display module data write enable signal 324 is enabled, the display data signals 310 are written in the display module memories 120 of the selected display modules 104. For example, a True IDE interface is used to provide the display module select signal 322 and the display module data write enable signal 324. Any interface that can provide the display module select signal 322 and the display module data write enable signal 324 can be an alternative.

With reference to FIG. 3A, FIG. 3B, FIG. 3C, and FIG. 4, the camera module 106 used the data read enable signal 321 as the display data read enable signal 326 and sends the data read enable signal 321 to the corresponding display modules 104. When the display data read enable signal 326 is enabled, the camera control module 404 reads the display data signals 310 from the display module memories 120 of the corresponding display modules 104. The camera module 106 bypasses the display data signals 310 to the host 102.

With reference to FIG. 3A and FIG. 4, the bypass circuit 502 receives a power on interface mode detection signal 424 (i.e. the I80M68 signal). The power on interface mode detection signal 424 determines the interface mode of the host 102 and the interface of the corresponding display modules 104. The bypass circuit 502 performs a conversion of the interface mode according to the interface mode of the host 102 and the display modules 104. The host 102 has different interface modes, such as Intel 80 mode or Motorola 68 mode. The display module 104 also has different interface modes, such as Intel 80 mode or Motorola 68 mode. The power on interface mode detection signal 424 detects and determines the interface mode of the host 102 and the corresponding display modules 104, such as Intel 80 mode for the host 102 and Motorola 68 mode for the display modules 104. Another example can be the situation where the host 102 is in Intel 80 mode and the corresponding display modules 104 are also in Intel 80 mode. The bypass circuit 502 can perform the interface mode conversion.

The following examples illustrate how the signals connect to each other. When the host 102 is in Intel 80 mode, the host 102 has a CS (chip select) signal, a RD (read enable) signal, a WR (write enable signal), and a D (data) signal. The CS signal is the chip select signal 316 mentioned above. The RD signal is the data read enable signal 321. The WR signal is the data write enable signal 320. The D signal is the host data signals 306.

For example, when display modules 104 are all in Intel 80 mode and two of the display modules 104 are connected to the camera module 106 respectively, one of the display modules 104 has a LCS1 (chip select) signal, a LRD (read enable)

signal, a LWR (write enable) signal, and LD (data) signals. The LCS1 signal and the LCS2 signal are the display module select signals 322. The LWR signal is the display module data write enable signal 324. The LRD signal is the display data read enable signal 326. The other display module 104 has the same signals, excluding a LCS2 (chip select) signal, as the display module mentioned above, such as the LRD signal, the LWR signal, and the LD signals. The signals of the other display module 104 are connected to the corresponding pins of the display module 104.

The command signal 318 from the host 102 has two bits represented by A0 and A1. In the camera module 106, when A1 is 0, LCS2 is 1, and LCS1 is 0. When A1 is 1, LCS2 is 0, and LCS1 is 1. RD is bypassed to LRD. WR is bypassed to LWR. A0 is bypassed to RS. RS is used to inform the display module 104 that the host data signals 306 are for control or for display. Moreover, D is bypassed to LD. Thus, the host 102 can select the display modules 104 and control the selected display modules 104.

Various combinations of the interface mode of the host 102 and the display module 104 are possible. A person skilled in the art may be able to modify the interface mode with reference to the invention to achieve substantially the same objects, but it does not exceed the scope of the invention.

With reference to FIG. 4, the bypass circuit 502 receives a power on data bit width detection signal 420 (i.e. the IOIS16 signal). The power on data bit width detection signal 420 determines the bit width of the host data signals 306 and the bit width of the display data signals 310. The bypass circuit 502 performs a bit width conversion according to the bit widths of the host data signal 306 and the display data signal 310.

With reference to FIG. 4, the host data signal 306 is, for example, 16 bit or 8 bit. The display data signal 310 is, for example, 16 bit or 8 bit. The bypass circuit 502 performs the bit conversion according to the command signals 318 or the command set including the camera address signal 304, the host data signals 306, and the host control signals 307.

The operation of the bridge mode of the invention is described in the following. With reference to FIG. 3A, FIG. 3B, and FIG. 4, the host 102 generates a chip select signal 316 and the camera module 106 selects the corresponding display modules 104 according to the combination of the chip select signal 316 and the command set. The bypass circuit 502 receives the command set 308 and bypasses the command set 308 to the internal circuit 503. The internal circuit 503 receives the image data signals 418 to decode the command set in cooperation with the central processing unit 414 and performs the image processing procedure on the image data signals 418, according to the definition of the command set, to generate the display data signals 310. The internal circuit 503 sends the display data signals 310 to the selected display modules 104 via the display module control interface 416. The image processing procedure is, for example, image compression, on screen display, image overlap, brightness adjustment, or color adjustment. The display module control interface 416 can adjust the received signals and modify the signals to meet the specification of the display 108 and send the signals to the selected display modules 104.

Therefore, in the bridge mode, the camera module 106 can efficiently control a plurality of display modules. The camera module 106 only needs a chip select signal 316 to select a plurality of display modules 104. The camera module 106 provides a function of directly performing an image processing on the image captured by the image sensor 402 and sending the results to the display modules 104.

With reference to FIG. 4, in the bridge mode, the memory 412 is used as the memory buffer of image processing. The internal circuit 503 receives the command set 308 and stores the command set 308 in the register 422. The internal circuit 503, in cooperation with the central processing unit 414 and the memory 412 and according to the command set 308 stored in the register 422, performs the image processing procedure. The internal circuit 503 sends the display data signals 310 to the selected display modules 104 via the display module control interface 416.

With reference to FIG. 4, the camera module 106 has a central processing unit 414. The central processing unit 414 controls the internal circuit 503, the bypass circuit 502, the display module control interface 416, and the memory 412 according to the command set 308.

Because the camera module 106 has a bypass mode and a bridge mode, the camera module 106 has both features of built-in and external enclosure. Therefore, without greatly modifying the software for the host, the camera module 106 can be easily integrated into a portable electronic apparatus, such as a cell phone or a personal digital assistant (PDA).

With reference to FIG. 3A and FIG. 4, in bypass mode, the display module 120 is used as the memory needed by the camera module 106 for image processing. In bridge mode, the display module memory 120 can be omitted. Instead, the memory 412 can be used by the camera module 106 for image processing.

Figure 5:
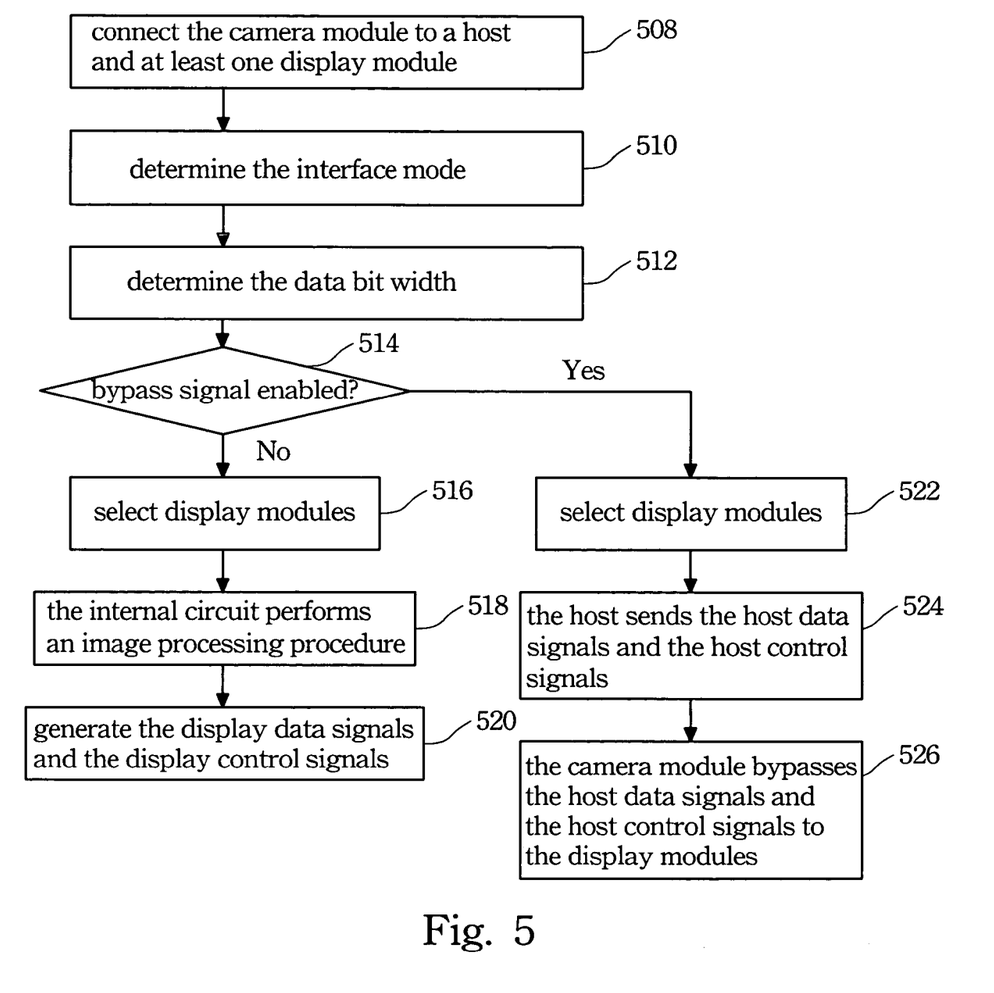
FIG. 5 is a flow chart illustrating a making method of a portable electronic apparatus having an image processing procedure according to the present invention.

The above embodiments can be described by a method. The structure and the signals mentioned in the following description should be read with reference back to the embodiments mentioned above. FIG. 5 is a flow chart illustrating a making method of a portable electronic apparatus having an image processing procedure. With reference to FIG. 5, first, a host and at least a display module are connected to a camera module (step 508). The internal structure and the connection of the camera module can be found in the descriptions of the above embodiments.

Next, the camera module receives a power on interface mode detection signal, and the power on interface mode detection signal determines the interface mode of the host and the display module (step 510). For example, the host is in Intel 80 mode and the corresponding display module 104 is in Motorola 68 mode. For another example, the host is in Intel 80 mode and the corresponding display module 104 is also in Intel 80 mode. The camera module performs the interface mode conversion.

Next, the camera module receives a power on data bit width detection signal, the power on data bit width detection signal determines the bit width of the host data signals and the display data signals (step 512). The host data signal is, for example, 16 bit or 8 bit. The display data signal is, for example, 16 bit or 8 bit. The camera module performs the conversion of the bit width.

Next, a bypass signal is determined to be enabled or disabled (step 514). When the bypass signal is enabled, the host is in a bypass mode. When the bypass signal is disabled, the host is in a bridge mode.

When the bypass signal is enabled, the camera module selects the display modules according to the combination of a chip select signal and a set of command signals (step 522).

Next, the host sends the host data signals and the host control signals to the camera module (step 524). The camera module receives the host data signals and the host control signals and bypasses the host data signals and the host control signals to the selected display modules.

When the bypass signal is disabled, the camera module selects the display modules according to the combination of a chip select signal and a command set (step 516).

Next, the internal circuit of the camera module performs an image processing procedure according to the command set and the image data signals (step 518). The internal circuit sends the display data signals and the display control signals generated by the image processing to the selected display modules (step 520). The detailed structure and circuit can be found in the description of the preferred embodiments described above.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic system having an image processing procedure, the system comprising:
    a host providing a command set;
    a first interface
    a second interlace;
    at least a display module sending data to a corresponding at least one display in response to a set of display control signal; and
    a camera module with an image sensor for capturing an image and providing a set of image data signals and a bypass circuit, wherein the camera module is connected to the host via the first interlace and connected to the at least one display module via the second interface, and wherein when the bypass circuit is disabled, the camera module performing an image processing procedure in response to the command set and the image data signals, and wherein when the bypass circuit is enabled, the camera module generating display data signals and sending the display data signals to the corresponding at least one display module,
    wherein the host further generates a chip select signal, the chip select signal is sent to the camera module via the first interface, the camera module selects the corresponding at least one display module in response to a combination of the chip select signal and the command set, and the camera module performs the image processing procedure in response to the command set to generate the display data signals and to send the display data signals to the corresponding at least one display module via the second interface.

2. The system of claim 1, wherein the host is connected to the camera module via a True IDE interface.

3. The system of claim 1, wherein the camera module further comprises a display module control interface, the camera module generates display control signals in response to the command set and the chip select signal, and the display control signals are sent to the corresponding at least one display module, via the display module control interface and the second interface, to control the corresponding at least one display module.

4. The system of claim 3, wherein the camera module further comprises:
    a memory;
    a register; and
    an internal circuit connected to the register and the memory respectively, the internal circuit receiving the command set and storing the command set in the register, the internal circuit using the command set stored in the register and using the memory to perform the image processing procedure to generate the display data signals and send the display data signals to the corresponding at least one display module via the second interface.

5. The system of claim 4, wherein the camera module further comprises a central processing unit, the central processing unit is connected to the internal circuit and the display module control interface, respectively, and the central processing unit controls the internal circuit in response to the command set, controls the display module control interface, and allocates the memory.

6. A camera module, comprising:
    an image sensor for capturing an image and providing a set of image data signals; and
    a camera control circuit with a bypass circuit connected to the image sensor, wherein the camera control circuit has a display module control interface for controlling at least a display module, the camera control circuit receives a bypass signal, the camera control circuit receives a set of host data signals when the bypass signal is enabled, the bypass circuit bypasses the host data signals to a corresponding at least one display module via the display module control interface, the camera module uses the host data signals as a set of display data signals, the camera module receives a command set when the bypass signal is disabled, and the camera module performs an image processing procedure according to the command set and the image data signals, wherein the at least one display module is connected to the camera module, the camera control circuit receives a chin select signal when the bypass signal is disabled and selects a corresponding at least one display module in response to the combination of the chip select signal and the command set, and the camera control circuit performs the image processing procedure, in response to the command set and the image data signals, to generate the display data signals and to send the display data signals to the corresponding at least one display module.

7. The module of claim 6, wherein the at least one display module is connected to the camera module, the camera control signal receives a set of host control signals when the bypass signal is enabled, and the host control signals comprises:
    a chip select signal;
    a set of command signals, wherein a combination of the command signals and the chip select signal is used to select the corresponding at least one display module; and
    a data write enable signal, wherein when the data write enable signal is enabled, the camera module bypasses the host data signals to the corresponding at least one display module, the camera module uses the host data signals as the display data signals and sends the host data signals to the corresponding at least one display module, and the host data signals are written in a display module memory of the corresponding at least one display module.

8. The module of claim 7, wherein when the bypass signal is enabled, the camera control circuit sends a set of display control signals, via the display module control interface, to the corresponding at least one display module respectively, and the display control signals comprise:

a display module select signal, the camera control circuit determining the display module select signal in response to the combination of the chip select signal and the command signals to select the corresponding display module; and a display module data write enable signal, wherein the camera module bypasses the data write enable signal to the corresponding at least one display module and uses the data write enable signal as the display module data write enable signal, and the display data signals are written in the display module memory of the corresponding at least one display module when the display module data write enable signal is enabled.

9. The module of claim 8, wherein the host control signals further comprises a data read enable signal, the display control signals further comprise a display data read enable signal, the camera control circuit reads the display data signals from the display module memory of the corresponding at least one display module when the display data read enable signal is enabled, and the camera control circuit bypasses the display signals to the host.

10. The module of claim 6, wherein the camera control circuit further comprises:

a memory used as a memory buffer for the image processing;

a register; and an internal circuit connected to the register and the memory respectively, the internal circuit receiving the command set and storing the command set in the register, the internal circuit using the command set stored in the register, the image data signals, and the memory to perform the image processing procedure to generate the display data signals and send the display data signals to the corresponding at least one display module.

11. The module of claim 10, wherein the camera control circuit further comprises a central processing unit, the central processing unit is connected to the internal circuit and the display module control interface, respectively, and the central processing unit controls the internal circuit in response to the command set, controls the display module control interface, and allocates the memory.

12. A making method of a portable electronic apparatus having an image processing procedure, the method comprising:

connecting a host and a camera module including a bypass circuit via a first interface;

connecting the camera module and at least a display module via a second interface;

providing a bypass signal to the camera module by the host via the first interface;

when the bypass signal is enabled, bypassing host data signals from the host to a corresponding at least one display module by the camera module for displaying; and when the bypass signal is disabled, performing the image processing procedure by the camera module in response to a command set from the host, wherein the host further generates a chip select signal, when the bypass signal is disabled the chip select signal is sent to the camera module via the first interface, the camera module selects the corresponding at least one display module in response to a combination of the chip select signal and the command set, and the camera module performs the image processing procedure in response to the command set to generate the display data signals and to send the display data signals to the corresponding at least one display module via the second interface.

13. The method of claim 12, further comprising:
determining an interface mode of the host and the display module.

14. The method of claim 12, further comprising:
determining the bit width of the host data signals and the bit width of the display data signals.

15. The method of claim 12, further comprising:
selecting display modules from the at least one display modules for displaying.

16. The method of claim 12, further comprising:
when the bypass signal is disabled, performing the image processing procedure in response to the command set and the host data signals by an internal circuit.

17. The method of claim 12, wherein when the bypass signal is enabled, the method further comprises:
generating host control signals by the host; and
bypassing the host data signals and the host control signals to the at least one display module by the host.

* * * * *